United States Patent
Kar et al.

(10) Patent No.: US 7,260,816 B2
(45) Date of Patent: Aug. 21, 2007

(54) METHOD, SYSTEM, AND PRODUCT FOR PROXY-BASED METHOD TRANSLATIONS FOR MULTIPLE DIFFERENT FIRMWARE VERSIONS

(75) Inventors: Abhishek Kar, Tucson, AZ (US); Robert Louis Morton, Tucson, AZ (US); Gary William Steffens, Tucson, AZ (US)

(73) Assignee: LSI Corporation, Milpitas, CA (US)

( * ) Notice: Subject to any disclaimer, the term of this patent is extended or adjusted under 35 U.S.C. 154(b) by 704 days.

(21) Appl. No.: 10/682,012

(22) Filed: Oct. 9, 2003

(65) Prior Publication Data

US 2005/0081217 A1    Apr. 14, 2005

(51) Int. Cl.
*G06F 9/45* (2006.01)

(52) U.S. Cl. ............... 717/136; 717/120; 719/328; 719/330; 719/332

(58) Field of Classification Search .............. 717/108, 717/116, 120, 136; 719/328, 332, 330
See application file for complete search history.

(56) References Cited

U.S. PATENT DOCUMENTS

| | | | |
|---|---|---|---|
| 6,415,435 B1 * | 7/2002 | McIntyre | 717/108 |
| 6,735,756 B1 * | 5/2004 | Linn et al. | 716/16 |
| 6,877,163 B1 * | 4/2005 | Jones et al. | 719/332 |
| 7,003,527 B1 * | 2/2006 | Lavallee et al. | 707/102 |
| 7,003,773 B2 * | 2/2006 | Hoennig et al. | 719/311 |
| 7,055,147 B2 * | 5/2006 | Iterum et al. | 717/170 |
| 2002/0129230 A1 * | 9/2002 | Albright et al. | 713/1 |

OTHER PUBLICATIONS

"Fibre Channel—Methodologies for Interconnects", American National Standard for Information Technology, Dec. 4, 2001, Annex A and B extracted (56 pages). Online retrieved at <http://www.t11.org/index.html>.*

* cited by examiner

*Primary Examiner*—Tuan Dam
*Assistant Examiner*—Thuy Dao
(74) *Attorney, Agent, or Firm*—Yee & Associates (57) ABSTRACT

The present invention is a method and system for translating method calls to version-specified method calls. An interface to an underlying object is provided. Applications communicating with the underlying object use the interface. The interface is separate from the underlying object. Version-specific underlying objects are generated. Each one of the version-specific underlying objects is a different version of the underlying object. A plurality of translation objects, one for each version-specific underlying object, are generated for communicating between the interface and each one of the version-specific underlying objects. A translation object is used for translating an interface method call invoked on the interface to a version-specific method call for the underlying object for each version of the underlying object. All translation objects are generated from a single proxy class and a single invocation handler class. The same proxy class and the same invocation handler class are used to generate the translation object for each different version of the underlying object.

24 Claims, 8 Drawing Sheets

METHOD, SYSTEM, AND PRODUCT FOR PROXY-BASED METHOD TRANSLATIONS FOR MULTIPLE DIFFERENT FIRMWARE VERSIONS

BACKGROUND OF THE INVENTION

1. Technical Field

The present invention relates generally to data processing systems such as computer systems, and more particularly to proxy-based API translations for multiple different firmware versions.

2. Description of the Related Art

A computer system includes firmware which provides an interface between the computer system's hardware and software. Typically, an operating system interacts with the hardware utilizing the firmware.

The hardware of a computer system is often revised and improved. It is desirable for software applications to interface with different versions of a computer system. When updates to the hardware occur, the firmware is also usually updated. Thus, the software applications that run on this hardware may need to interact with different versions of firmware so that the software application can interact with the different versions of firmware.

Each version of firmware will include a set of application programming interfaces (APIs) which are used by the software for accessing the firmware. One method for permitting software to interact with the firmware API is to provide interfaces, for example remote procedure calls (RPCs), between the software layer and the firmware API layer. The firmware interface includes methods and classes that are used to represent the current configuration of the hardware and to change the configuration. To differentiate the classes from one firmware release to another for a particular type of API, the firmware changes the class name such that a different Java class name exists for each firmware release for that type of API. The interface software must be written so that it will recognize the different class names for each firmware release. To create a separate class for each method call for each release would create a lot of interface code. In addition, most of the interface code for a new release would be duplicated from the previous release. These interfaces each represent a small slice of the total firmware APIs. Therefore, in order to represent all of the firmware APIs, many interfaces are required. For example, there may be hundreds of interfaces which when taken together represent an entire set of firmware APIs.

These firmware APIs are specific to a particular version of the firmware. Thus, software that was written to access a version of firmware using one set of firmware APIs will not be able to access a different version of firmware which uses a different set of firmware APIs. The interfaces can be thought of as a software layer above the firmware API layer. These interfaces must have information about a specific version of firmware APIs.

The prior art provides for code that recasts an interface call to a particular firmware version API call. This code consists of a collection of different classes that recast the interface to each version of firmware. For each interface, there will be as many classes as there are firmware versions in order to recast the interface for each version. This code is referred to below as an implementation instance. Thus, there is a different implementation class to create each implementation instance for each interface for each version of supported firmware. When there are hundreds of interfaces, hundreds of classes are necessary to permit the interfaces to interact with each possible firmware API version.

Figure 1:
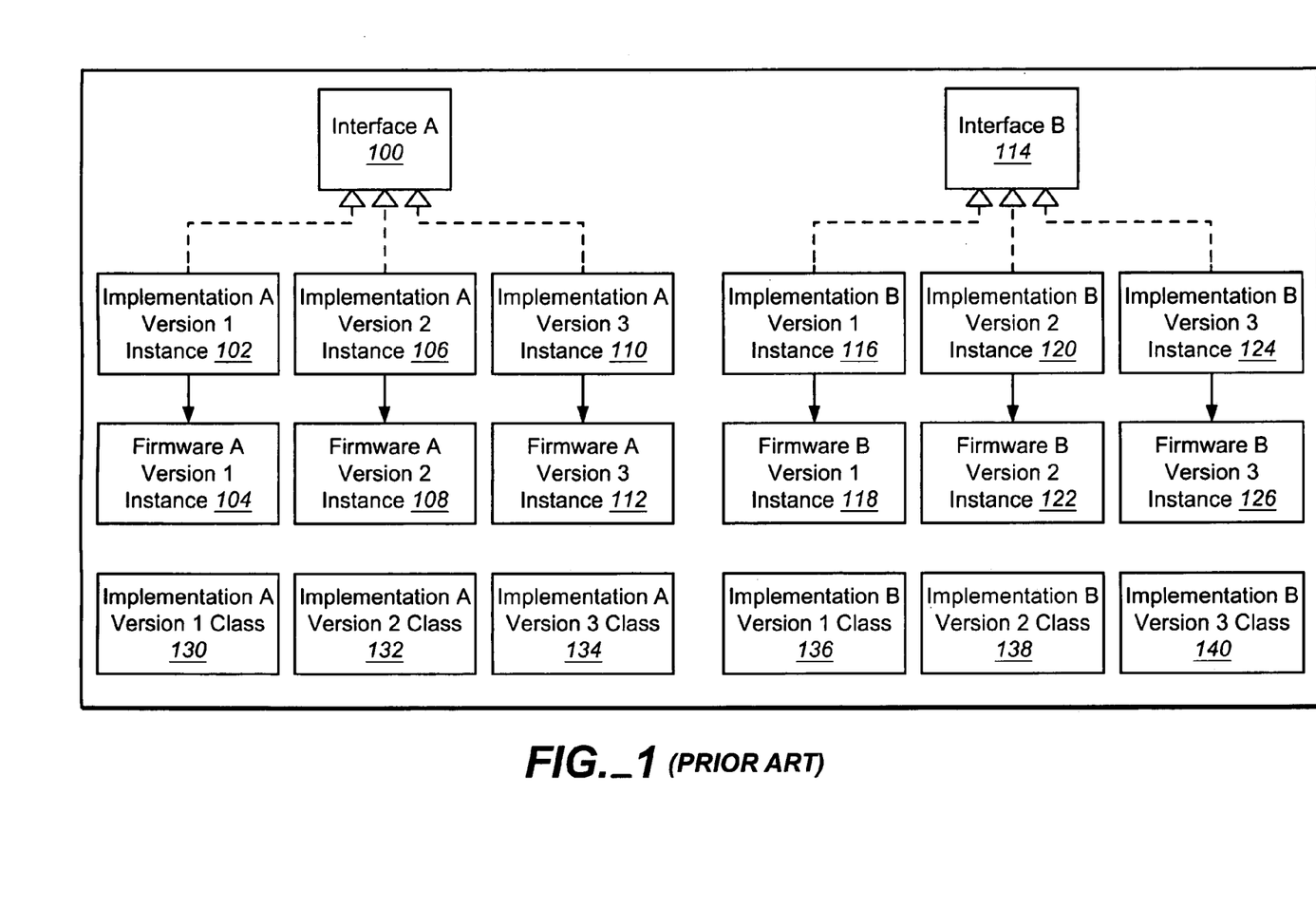
FIG. 1 is a block diagram, which follows the Unified Modeling Language (UML) convention, that depicts two different interfaces and the classes that are necessary to support these interfaces with different versions of firmware in accordance with the prior art.

For example, FIG. 1 is a block diagram, which follows the Unified Modeling Language (UML) notation, that depicts two different interfaces and the classes that are necessary to support these interfaces with different versions of firmware in accordance with the prior art. An interface A 100 represents a portion A of the firmware. An interface B 114 represents a portion B of the firmware. Interface A 100 may access a portion A instance of version 1 104 of the firmware using implementation A version 1 instance 102. Thus, when interface A 100 is used in a system that includes firmware version 1, implementation instance 102 is used to access portion A.

Interface A 100 may access a portion A instance of version 2 108 of the firmware using implementation A version 2 instance 106. Interface A 100 may access a portion A of version 3 112 of the firmware using implementation A version 3 instance 110.

Interface B 114 may access a portion B instance of version 1 118 of the firmware using implementation B version 1 instance 116. Interface B 114 may access a portion B of version 2 122 of the firmware using implementation B version 2 instance 120. Interface B 114 may access a portion B of version 3 126 of the firmware using implementation B version 3 instance 124. For example, implementation A version 1 instance 102 implements interface A 100 and recasts the APIs found in interface A 100 into their equivalent version-specific APIs of firmware A version 1 instance 104.

Each implementation instance is an instance of a different class. For example, implementation A version 1 instance 102 is an instance of implementation A version 1 class 130. Implementation A version 2 instance 106 is an instance of implementation A version 2 class 132. Implementation A version 3 instance 110 is an instance of implementation A version 3 class 134. Implementation B version 1 instance 116 is an instance of implementation B version 1 class 136. Implementation B version 2 instance 120 is an instance of implementation B version 2 class 138. Implementation B version 3 instance 124 is an instance of implementation B version 3 class 140. Therefore, in order to implement an interface a particular number of firmware versions requires that number of classes. This number is multiplied by the total number of interfaces in order to implement all of the firmware APIs.

Figure 2:
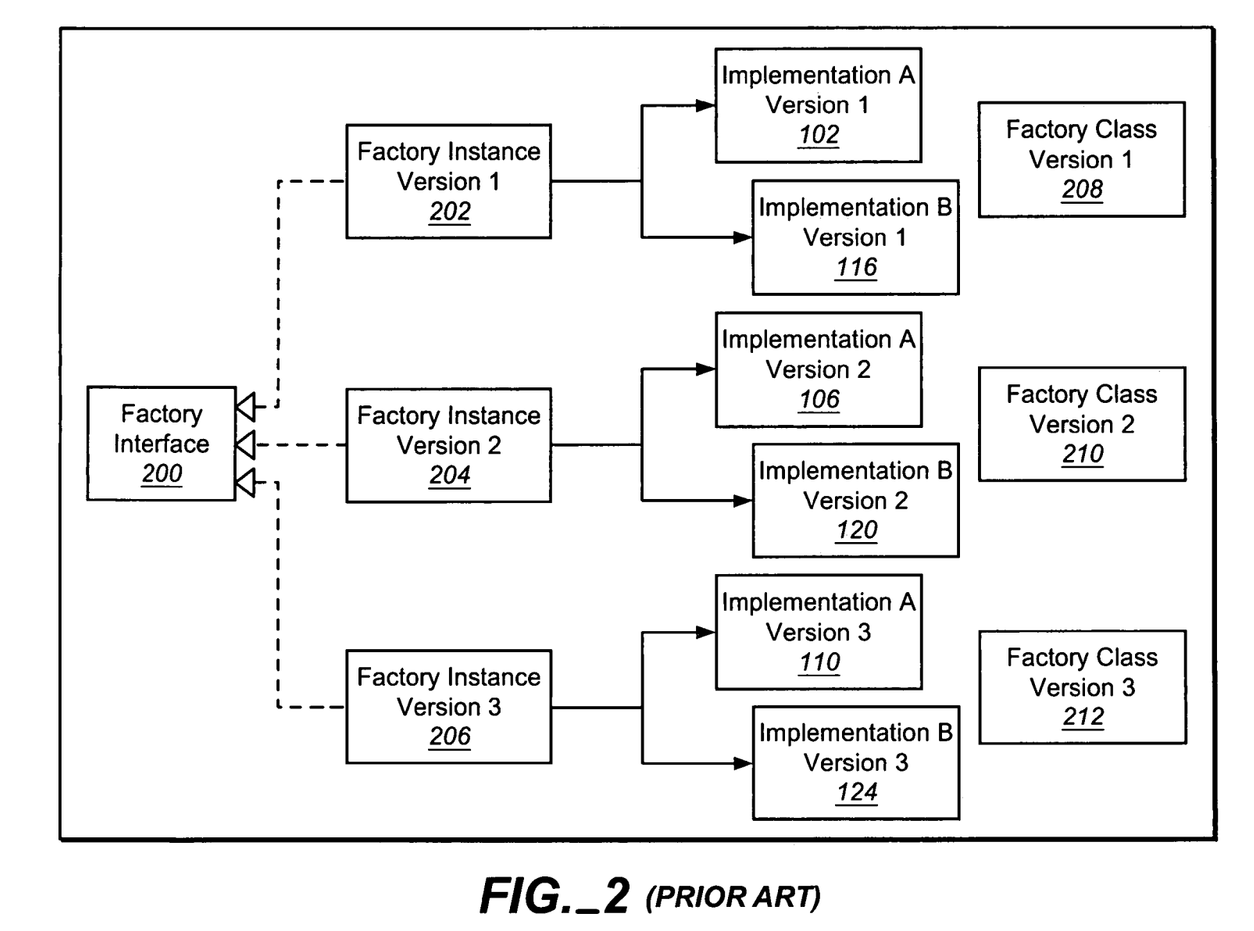
FIG. 2 is a UML diagram that illustrates a factory interface and the classes that are necessary to create factory objects in accordance with the prior art.

In addition, there are other objects that do the work of creating the implementation instance from the implementation classes. There is a factory object to create a factory instance for each firmware version for creating the implementation instances for each version of firmware. FIG. 2 is a UML diagram that illustrates a factory interface that may be used to create factory objects in accordance with the prior art. Factory interface 200 may be used to create factory instance version 1 202, factory instance version 2, 204, and factory instance version 3 206. Factory instance version 1 202 is an instance of factory class version 1 208. Factory instance version 2 204 is an instance of factory class version 2 210. And, factory instance version 3 206 is an instance of factory class version 3 212.

Factory instance version 1 202 may be used to create the implementation instances for each interface for firmware version 1. Factory instance version 1 202 is used to create implementation A version 1 102 and implementation B version 1 116. Factory instance version 2 204 is used to create implementation A version 2 106 and implementation B version 2 120. And, factory instance version 3 206 is used to create implementation A version 3 110 and implementation B version 3 124. Whenever a new firmware version needs to be supported, a new factory instance must be created which will create the implementation instance for each interface for that version.

As should be apparent from the description above, many thousands of lines of code must be written to create all of the implementation classes and factory classes that are needed to create the various objects.

Therefore, a need exists for a method and system for reducing the amount of code that is needed to support multiple different versions of firmware.

SUMMARY OF THE INVENTION

The present invention is a method and system for translating method calls to version-specific method calls. An interface to an underlying object is provided. Applications communicating with the underlying object use the interface. The interface is separate from the underlying object. Version-specific underlying objects are generated. Each one of the version-specific underlying objects is a different version of the underlying object. A translation object is generated for communicating between the interface and each one of the version-specific underlying objects. The translation object is used for translating an interface method call invoked on the interface to a version-specific method call for the underlying object for each version of the underlying object. The translation object is generated from a single proxy class and a single InvocationHandler class. The same proxy class and the same InvocationHandler class are used to generate the translation object for each different version of the underlying object.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

Figure 3:
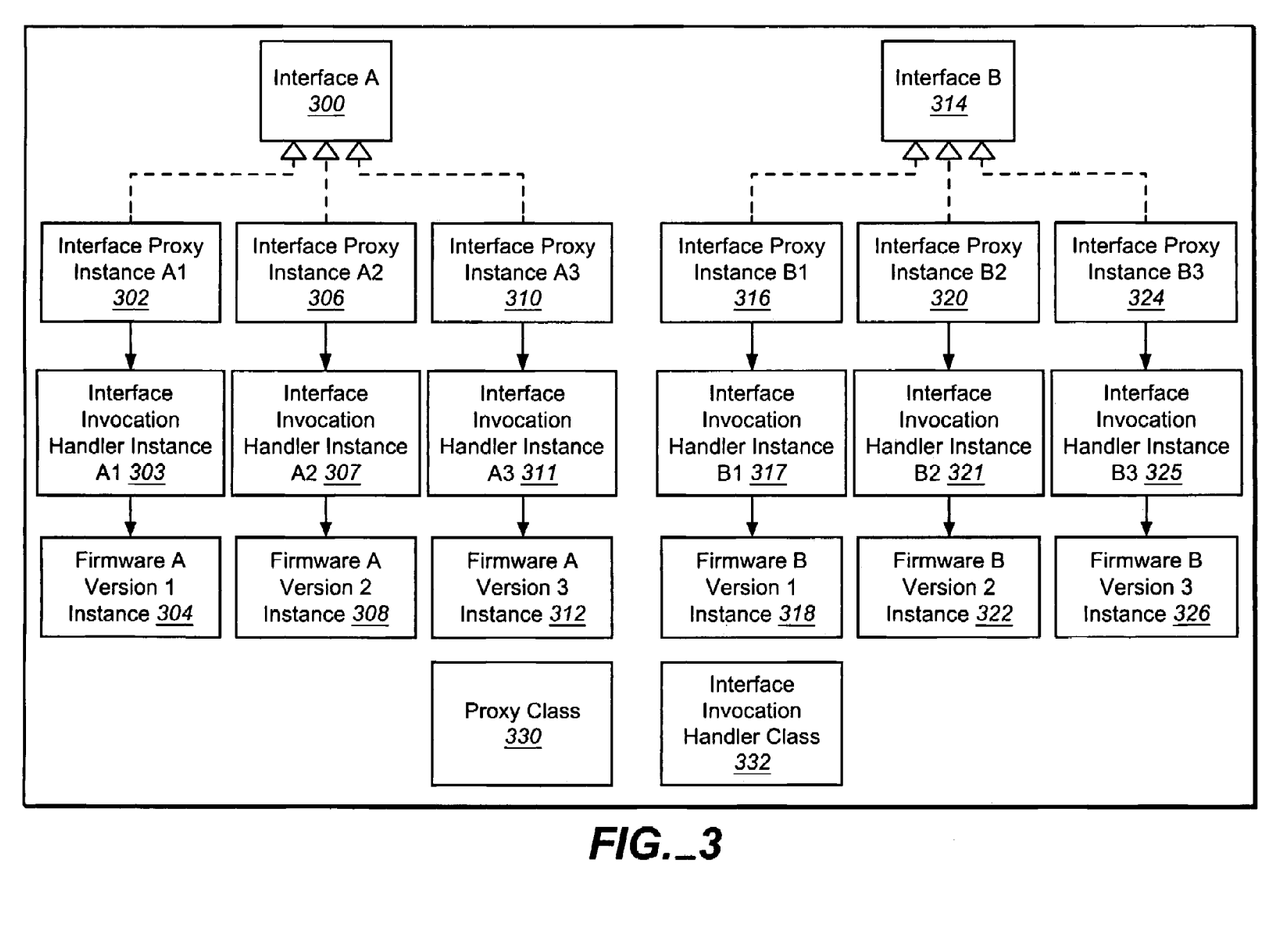
FIG. 3 is a UML diagram that depicts two different interfaces and the classes that are necessary to support these interfaces with different versions of firmware in accordance with the present invention.

FIG. 3 is a UML diagram that depicts two different interfaces and the classes that are necessary to support these interfaces with different versions of firmware in accordance with the present invention. Those skilled in the art will recognize that although FIG. 3 depicts only two interfaces, any number of interfaces may be implemented in a similar manner. A translation object is depicted which is used to recast method calls from a particular interface to the call required by a particular firmware version. Multiple different proxy instances and invocation handler instances are depicted. Each proxy instance include a reference to, and thus includes, an invocation handler instance. Thus, a translation object that includes a proxy instance and an invocation handler instance are depicted for each version of the firmware, i.e. for each firmware instance. According to an important feature of the present invention, a translation object for each interface is created from a single proxy class and a single invocation handler class.

For example, a first translation object includes proxy instance 302 and invocation handler instance 303. A second translation object includes proxy instance 306 and invocation handler instance 307. A third translation object includes proxy instance 310 and invocation handler instance 311. A fourth translation object includes proxy instance 316 and invocation handler instance 317. A fifth translation object includes proxy instance 320 and invocation handler instance 321. And, a sixth translation object includes proxy instance 324 and invocation handler instance 325.

The invocation handlers are referred to herein as "InvocationHandler".

An interface A 300 represents a portion A of the firmware. Interface A 300 may access a portion A instance of version 1 304 of the firmware using interface proxy instance A1 302 and interface InvocationHandler instance A1 303. Thus, when interface A 300 is used in a system that includes firmware version 1, interface proxy instance A1 302 and interface InvocationHandler instance A1 303 are used to access portion A. When interface A 300 is used in a system that includes firmware version 2, interface proxy instance A2 306 and interface InvocationHandler instance A2 307 are used to access portion A. When interface A 300 is used in a system that includes firmware version 3, interface proxy instance A3 310 and interface InvocationHandler instance A3 311 are used to access portion A. Interface A 300 is a union of all methods available in all versions of the corresponding firmware object.

An interface B 314 represents a portion B of the firmware. When interface B 314 is used in a system that includes firmware version 1, interface proxy instance B1 316 and interface InvocationHandler instance B1 317 are used to access portion B. When interface B 314 is used in a system that includes firmware version 2, interface proxy instance B2 320 and interface InvocationHandler instance B2 321 are used to access portion B. When interface B 314 is used in a system that includes firmware version 3, interface proxy instance B3 324 and interface InvocationHandler instance B3 325 are used to access portion B.

The present invention provides for the creation of all proxy instances and all InvocationHandler instances which are necessary for all interfaces utilizing only two classes. Thus, only two classes are necessary in order to provide functionality that is equivalent to the six different implementer classes depicted by FIG. 1 of the prior art. For a system having 290 different interfaces, the prior art required 290 different classes to create the 290 implementation instances.

According to the present invention, for a system having 290 different interfaces, only two classes are necessary to create the 290 different translation objects.

Proxy class 330 and interface InvocationHandler class 332 are the only classes that are necessary in order to create the translation object of the an implementer layer between the interface layer and the firmware API layer for any firmware version. Further, the Java programming language includes the Proxy class and an InvocationHandler abstract class. Thus, the present invention describes using this Proxy class with a new class which is a subclass of the InvocationHandler, i.e. the interface InvocationHandler class, in order to create a translator object that recasts methods invoked on the interface to the equivalent method to be invoked on the particular version of the firmware.

Those skilled in the art will recognize that although the Java programming language is used, other programming language may instead be used.

Figure 4:
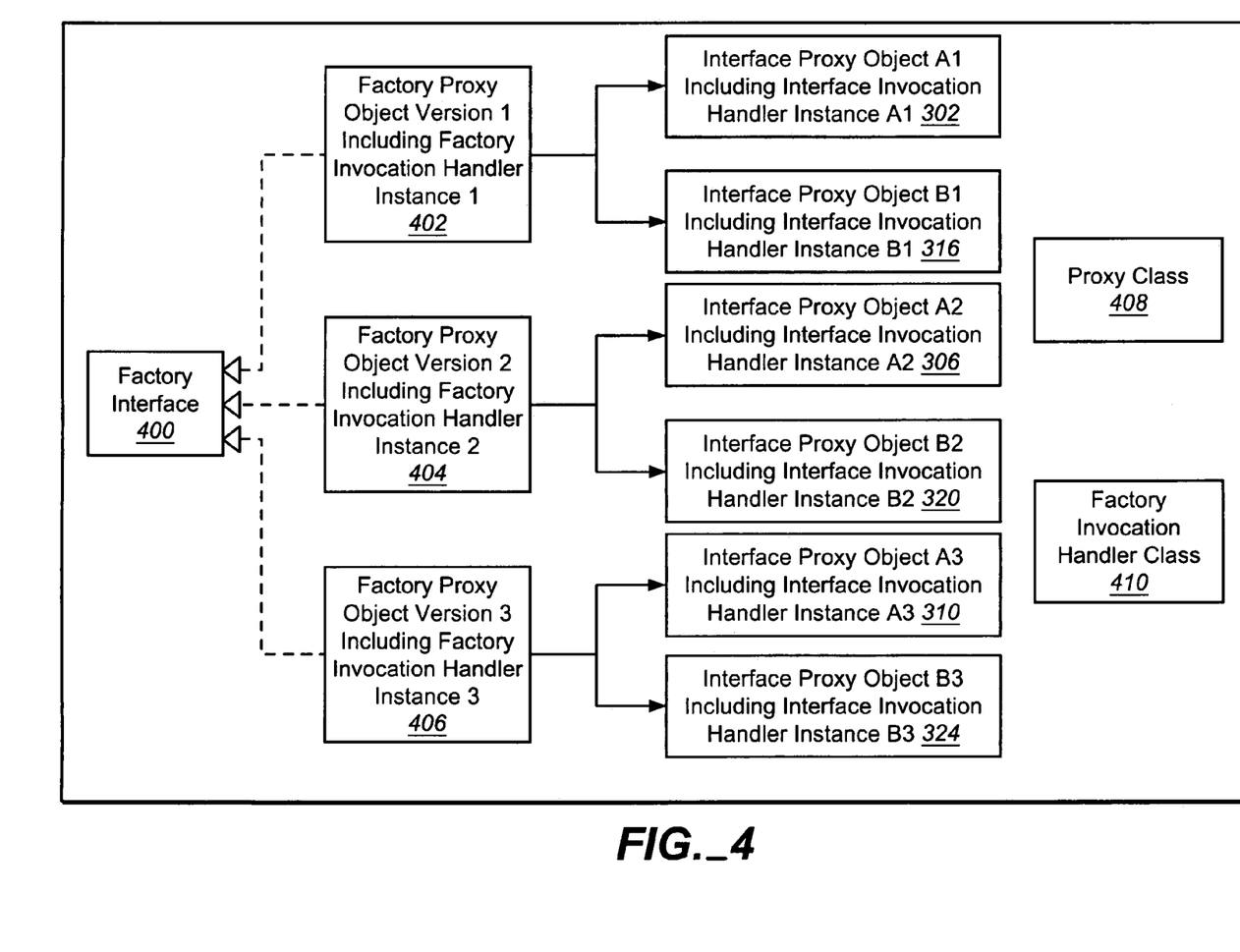
FIG. 4 is a UML diagram that illustrates a factory interface and the classes that are necessary to create factory objects in accordance with the present invention.

FIG. 4 is a UML diagram that illustrates a factory interface and the classes that are necessary to create factory objects in accordance with the present invention. Factory proxy instance version 1 including factory InvocationHandler instance 1 402, factory proxy instance version 2 including factory InvocationHandler instance 2 404, and factory proxy instance version 3 including factory InvocationHandler instance 3 406, all inherit from factory interface 400. Similarly to the description of FIG. 3, only two classes, in addition to the interface class, are needed in order to create instance 402, instance 404, and instance 406. Proxy class 408, which is the same as Proxy class 320, and factory InvocationHandler class 410 are used to create factory proxy instance version 1 including factory InvocationHandler instance 1 402, factory proxy instance version 2 including factory InvocationHandler instance 2 404, and factory proxy instance version 3 including factory InvocationHandler instance 3 406.

Figure 5A:
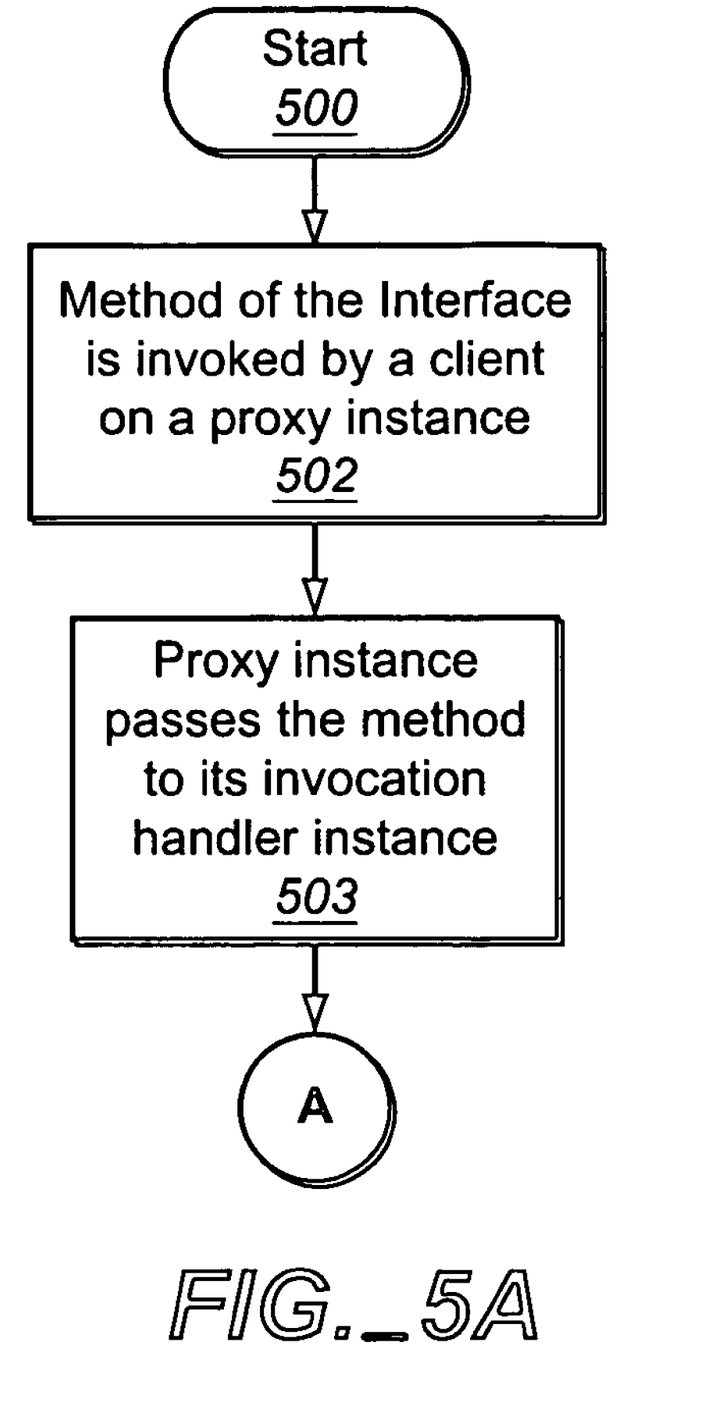
FIG. 5A depicts a high level flow chart which illustrates the process of a proxy instance in accordance with the present invention.

FIG. 5A depicts a high level flow chart which illustrates the process of a proxy instance in accordance with the present invention. The process starts as depicted by block 500 and thereafter passes to block 502 which illustrates a method of a particular interface being invoked by a client on a proxy instance. Next, block 503 depicts the proxy instance passing the method to its InvocationHandler instance. The process then passes to block 504 shown in FIG. 5B.

Figure 5B:
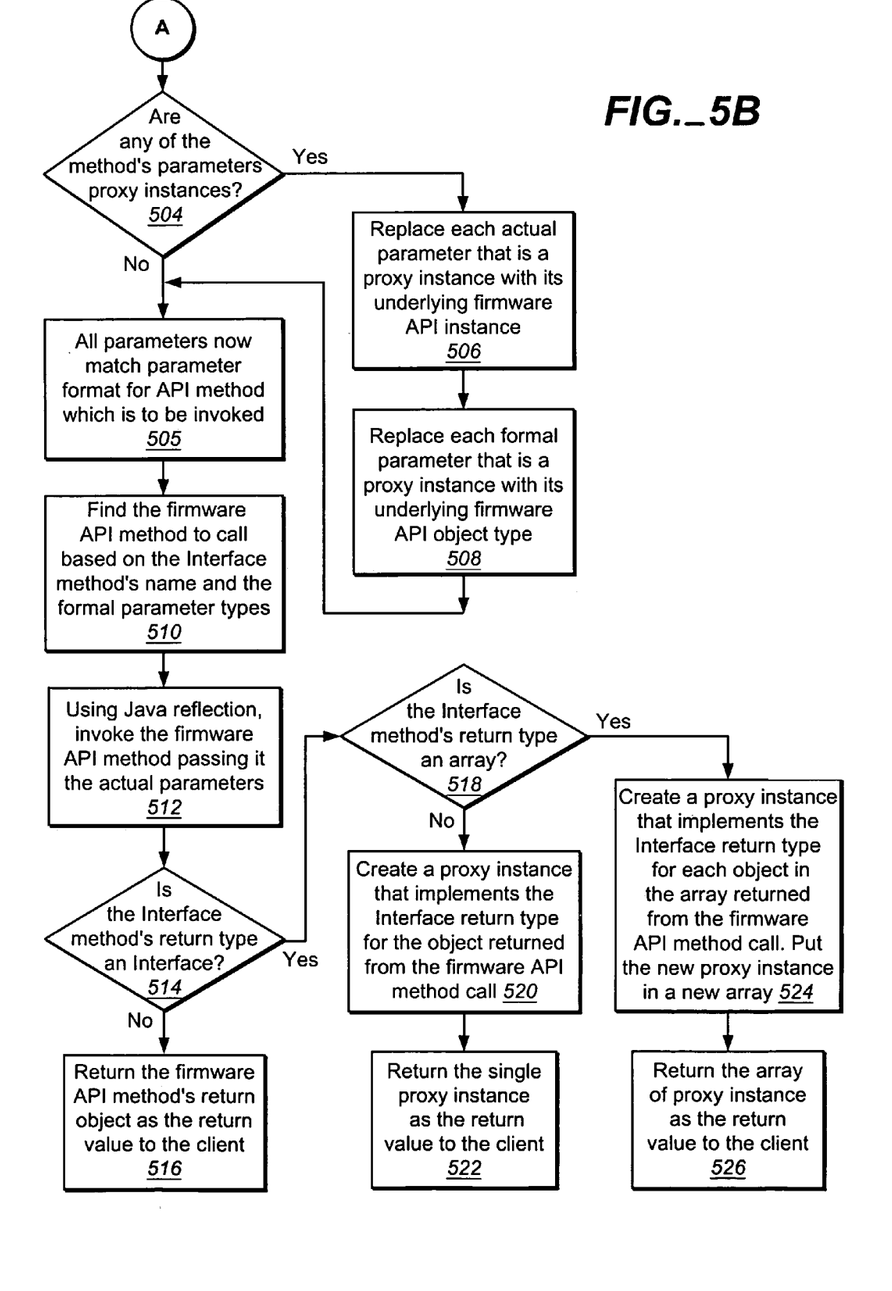
FIG. 5B illustrates a high level flow chart which depicts the process of an InvocationHandler instance in accordance with the present invention.

FIG. 5B illustrates a high level flow chart which depicts the process of an InvocationHandler in accordance with the present invention. Block 504 depicts a determination of whether or not any of the method's parameters are proxy instances. If a determination is made that at least one of the method's parameters are a proxy instance, the process passes to block 506 which illustrates replacing each actual parameter that is a proxy instance with its associated underlying firmware API instance. Next, block 508 depicts replacing each formal parameter that is a proxy instance with its underlying firmware API object type. The process then passes to block 505 which illustrates the parameters now matching the parameters format for the firmware API that is to be involked.

Block 510, then, illustrates the InvocationHandler instance finding the firmware API method to call based on the interface method's name and the API method's formal parameter types. This involves the ability, during runtime, of looking up a class, and finding the methods defined in the class which includes information about formal parameters and return values. Knowing the method name, its formal parameter types, and the actual parameters enables dynamic invocation of the method. Thereafter, block 512 depicts the InvocationHandler instance using Java reflection to invoke the firmware API method passing it the actual parameters. The process then passes to block 514 which illustrates a determination of whether or not the interface method's return type is an interface. If a determination is made that the interface method's return type is not an interface, the process passes to block 516 which depicts the InvocationHandler instance returning the firmware API method's return object as the return value to the client.

Referring again to block 514, if a determination is made that the interface method's return type is an interface, the process passes to block 518 which illustrates a determination of whether or not the interface method's return type is an array. If a determination is made that the interface method's return type is not an array, the process passes to block 520 which depicts the InvocationHandler instance creating a proxy instance that implements the interface return type for the object returned from the firmware API method call. The process then passes to block 522 which illustrates the InvocationHandler instance returning the single proxy instance as the return value to the client. Referring again to block 518, if a determination is made that the interface method's return type is an array, the process passes to block 524 which illustrates creating a proxy instance that implements the interface return type for each object in the array returned from the firmware API method call. The new proxy instances are put into a new array. Next, block 526 depicts returning the array of proxy instances as the return value to the client.

The process depicted by blocks 514-526 is executed by a factory proxy instance.

Figure 6:
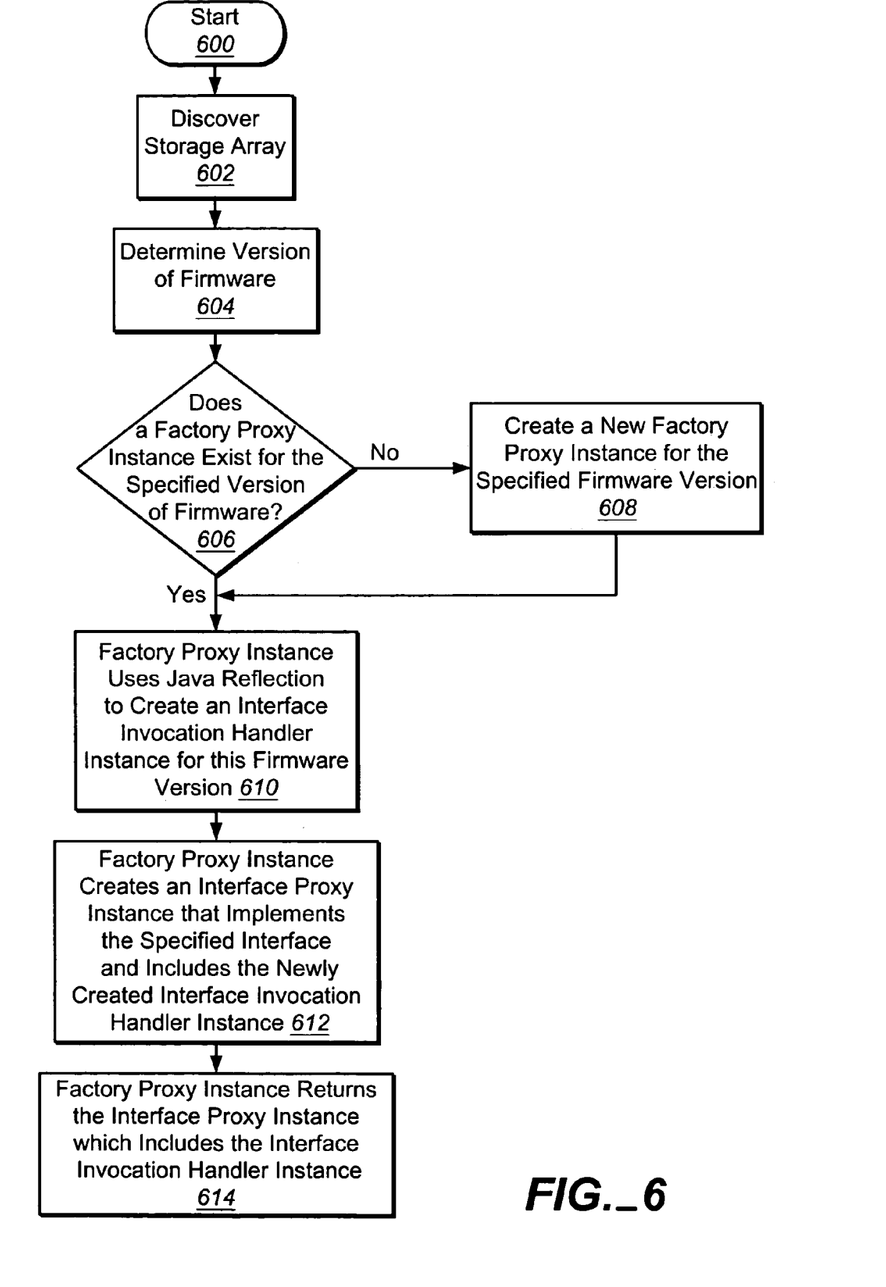
FIG. 6 depicts a high level flow chart which illustrates the process of a factory object that creates a proxy instance and an InvocationHandler instance for a particular firmware version in accordance with the present invention.

FIG. 6 depicts a high level flow chart which illustrates the process of a factory instance that creates an interface proxy instance including an interface InvocationHandler instance for a particular firmware version in accordance with the present invention. The process starts as depicted by block 600 and thereafter passes to block 602 which illustrates discovering a storage array. Next, block 604 depicts determining the current version of the firmware. Block 606, then, depicts determining whether a factory proxy instance currently exists for the determined version of firmware. A factory object may be thought of as a building object that is used to create an interface proxy instance and an interface InvocationHandler instance for a specific firmware version. If a determination is made that a factory proxy instance does not exist for the current firmware version, the process passes to block 608 which illustrates creating a new factory proxy instance for the specified firmware version. The process then passes to block 610. Referring again to block 606, if a determination is made that a factory proxy instance does exist for the specified firmware version, the process passes to block 610.

Block 610, then, depicts the factory proxy instance using Java reflection to create an interface InvocationHandler instance for this firmware version. Next, block 612 illustrates the factory proxy instance creating an interface proxy instance that implements the specified interface and includes a reference to the newly created interface InvocationHandler instance. Thus, the interface proxy instance may be thought of as including the interface InvocationHandler instance. The process then passes to block 614 which depicts the factory proxy instance returning the interface proxy instance which includes the interface InvocationHandler instance.

Figure 7:
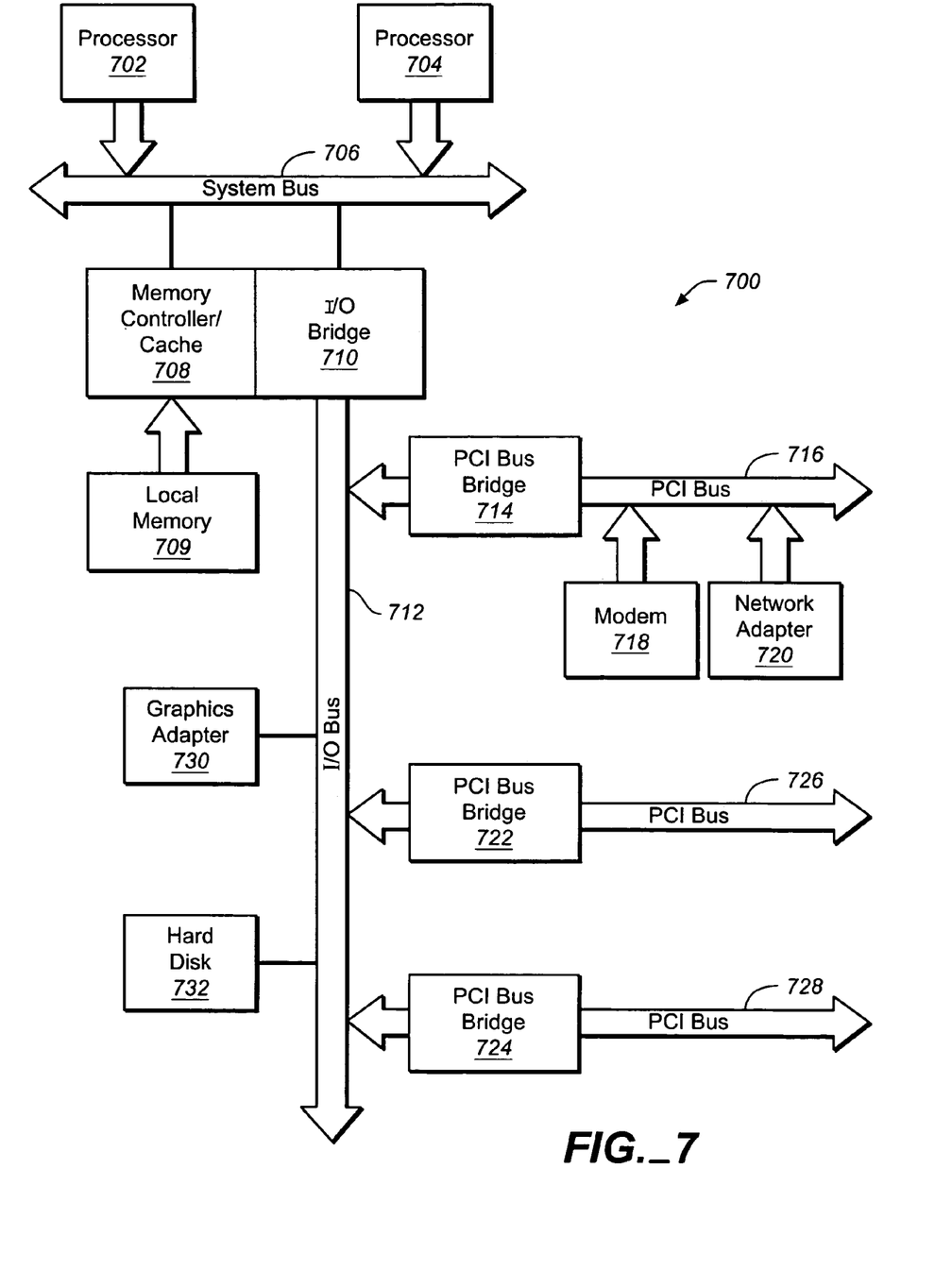
FIG. 7 illustrates a computer system that may be used to implement the present invention in accordance with the present invention.

FIG. 7 is an illustration of a computer system that may be used to implement the present invention in accordance with the present invention. Data processing system 700 may be a symmetric multiprocessor (SMP) system including a plurality of processors 702 and 704 connected to system bus 706. Alternatively, a single processor system may be employed. Also connected to system bus 706 is memory controller/cache 708, which provides an interface to local memory 709. I/O bus bridge 710 is connected to system bus 706 and provides an interface to I/O bus 712. Memory controller/cache 708 and I/O bus bridge 710 may be integrated as depicted.

Peripheral component interconnect (PCI) bus bridge 714 connected to I/O bus 712 provides an interface to PCI local bus 716. A number of modems may be connected to PCI bus 716. Typical PCI bus implementations will support four PCI expansion slots or add-in connectors. Communications links to network computers may be provided through modem 718 and network adapter 720 connected to PCI local bus 716 through add-in boards.

Additional PCI bus bridges 722 and 724 provide interfaces for additional PCI buses 726 and 728, from which additional modems or network adapters may be supported. In this manner, data processing system 700 allows connections to multiple network computers. A memory-mapped graphics adapter 730 and hard disk 732 may also be connected to I/O bus 712 as depicted, either directly or indirectly.

Those of ordinary skill in the art will appreciate that the hardware depicted in FIG. 7 may vary. For example, other peripheral devices, such as optical disk drives and the like, also may be used in addition to or in place of the hardware depicted. The depicted example is not meant to imply architectural limitations with respect to the present invention.

The following is an example of the present invention:

(This is the interface.)

```
StorageInterface exposes method to get StorageArray
objects (disk drive, volume etc)
interface StorageInterface {
    GetDiskDrive(...);
    GetStorageVolume(...);
    ...
}
```

(This is the InvocationHandler instance.)

```
class StorageHandler {
    invoke(...){
    }
} //call this instance Handler1
```

When a particular translation object instance, referred to below as translation1, is created for StorageInterface, we create an instance of Java's Proxy class and designate the StorageInterface as the external view of this instance of the Proxy class. We create an instance of the StorageHandler, i.e. Handler1, and set that as the InvocationHandler instance included within this translation object. So we get a new instance that looks like:

```
StorageInterface{ //anybody referring to this instance will see what looks
like a
    //StorageInterface
    Underneath is Java's Proxy object {
        Contains Handler1 which is an instance of the InvocationHandler
}
} //Call this instance translation1
```

When the client calls getDiskDrive( ) on this new instance "translation1", the call is handled by the InvocationHandler of the proxy instance (i.e. in response to translation1.getDiskDrive( ) . . . the Proxy (Java) implementation will call the invoke method of Handler1 and pass in arguments that specify what the original call to translation1 was. The InvocationHandler Handler1 will respond as required and return a the requested object.

It is important to note that while the present invention has been described in the context of a fully functioning data processing system, those of ordinary skill in the art will appreciate that the processes of the present invention are capable of being distributed in the form of a computer readable medium of instructions and a variety of forms and tat the present invention applies equally regardless of the particular type of signal bearing media actually used to carry out the distribution. Examples of computer readable media include recordable-type media such a floppy disc, a hard disk drive, a RAM, and CD-RQMs.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system that implements an object-oriented software environment for translating method calls to version-specific method calls, said method comprising the steps of:

providing an interface to an underlying object, applications utilizing said interface to communicate with said underlying object, said interface being separate from said underlying object;

generating a plurality of version-specific underlying objects, each one of said version-specific underlying objects being a different version of said underlying object;

generating a plurality of translation objects, each one of said plurality of translation objects for communicating between said interface and a different one of said version-specific underlying objects;

each one of said plurality of translation objects including a proxy instance and an invocation handler instance;

receiving, by a particular one of said plurality of translation objects, a particular interface method call that was invoked on said interface, said particular one of said plurality of translation objects for communicating between said interface and a particular one of said version-specific underlying objects, said particular interface method call including a name and formal parameters;

translating, by a particular invocation handler instance that is included in said particular one of said plurality of translation objects, said particular interface method call by determining a version-specific method call that corresponds to said particular interface method call using said name and said formal parameters of said particular interface method call;

invoking, by said particular invocation handler instance, said version-specific method call;

wherein, said plurality of translation objects are used to translate interface method calls that were invoked on said interface to corresponding version-specific method calls for each version of said underlying object; and generating said plurality of translation objects from a single proxy class and a single invocation handler class, wherein the same proxy class and invocation handler class are used to generate said plurality of translation objects.

2. The method according to claim 1, further comprising the steps of:

determining a current version of said underlying object;

determining whether a translation object exists for said current version;

in response to determining that said translation object does not exist for said current version, generating said translation object for said current version utilizing a building object; and including said generated translation object for said current version in said plurality of translation objects.

3. The method according to claim 2, further comprising the steps of:

creating said building object utilizing said proxy class and said invocation handler class.

4. The method according to claim 1, further comprising the steps of:

generating a building instance of said proxy class and said invocation handler class;

utilizing said building instance to generate said proxy instance and said invocation handler instance for each one of said plurality of translation objects.

5. The method according to claim 1, further comprising the steps of:

invoking said particular interface method call by a client object; and returning, by said particular invocation handler instance, said return object to said client object.

6. The method according to claim 5, further comprising the steps of:

determining whether said return object is a second interface; and in response to a determination that said return object is said second interface, creating a second proxy instance that implements a return type for said second interface.

7. The method according to claim 5, further comprising the steps of:

determining whether said return object is a second interface;

in response to determining that said return objects is said second interface, determining whether said return type is an array; and in response to determining that said return object is an array, creating a separate proxy instance that implements a return type for said second interface for each element of said array.

8. The method according to claim 1, further comprising the steps of:

determining whether any of said formal parameters are proxy objects; and in response to determining that at least one of said formal parameters are proxy objects, replacing each said proxy object with an underlying object type for said particular one of said version-specific underlying objects.

9. A data processing system that implements an object-oriented software environment for translating method calls to version-specific method calls, comprising:

a central processing Unit (CPU)

an interface to an underlying object, applications utilizing said interface to communicate with said underlying object, said interface being separate from said underlying object;

a plurality of version-specific underlying objects, each one of said version-specific underlying objects being a different version of said underlying object;

a plurality of translation objects, each one of said plurality of translation objects for communicating between said interface and a different one of said version-specific underlying objects;

each one of said plurality of translation objects including a proxy instance and an invocation handler instance;

a particular one of said plurality of translation objects receiving a particular interface method call that was invoked on said interface, said particular one of said plurality of translation objects for communicating between said interface and a particular one of said version-specific underlying objects, said particular interface method call including a name and formal parameters;

a particular invocation handler instance that is included in said particular one of said plurality of translation objects translating said particular interface method call by determining a version-specific method call that corresponds to said particular interface method call using said name and said formal parameters of said particular interface method call;

said particular invocation handler instance invoking said version-specific method call;

wherein, said plurality of translation objects are used to translate interface method calls that were invoked on said interface to corresponding version-specific method calls for each version of said underlying object; and said plurality of translation objects being generated from a single proxy class and a single invocation handler class, wherein the same proxy class and invocation handler class are used to generate said plurality of translation objects.

10. The system according to claim 9, further comprising:
said CPU executing code for determining a current version of said underlying object;
said CPU executing code for determining whether a translation object exists for said current version;
in response to determining that said translation object does not exist for said current version, said translation object for said current version being generated utilizing a building object; and
said generated translation object for said current version being included in said plurality of translation objects.

11. The system according to claim 10, further comprising:
said building object being created utilizing said proxy class and said invocation handler class.

12. The system according to claim 9, further comprising:
a building instance of said proxy class and said invocation handler class;
said building instance being utilized to generate said proxy instance and said invocation handler instance for each one of said plurality of translation objects.

13. The system according to claim 9, further comprising:
said particular interface method call being invoked by a client object; and
said particular invocation handler instance returning said return object to said client object.

14. The system according to claim 13, further comprising:
said CPU executing code for determining whether said return object is a second interface; and
in response to a determination that said return object is said second interface, said CPU executing code for creating a second proxy instance that implements a return type for said second interface.

15. The system according to claim 13, further comprising:
said CPU executing code for determining whether said return object is a second interface;
in response to determining that said return object is said second interface, said CPU executing code for determining whether said return type is an array; and
in response to determining that said return object is an array, said CPU executing code for creating a separate proxy instance that implements a return type for said second interface for each element of said array.

16. The system according to claim 9, further comprising:
said CPU executing code for determining whether any of said formal parameters are proxy objects; and
in response to determining that at least one of said formal parameters are proxy objects, said CPU executing code for replacing each said proxy object with an underlying object type for said particular one of said version-specific underlying objects.

17. A computer program product, recorded on a computer-readable medium, in a data processing system that implements an object-oriented software environment for translating method calls to version-specific method calls, said product comprising:
instruction means for providing an interface to an underlying object, applications utilizing said interface to communicate with said underlying object, said interface being separate from said underlying object;
instruction means for generating a plurality of version-specific underlying objects, each one of said version-specific underlying objects being a different version of said underlying object;
instruction means for generating a plurality of translation objects, each one of said plurality of translation objects for communicating between said interface and a different one of said version-specific underlying objects;
each one of said plurality of translation objects including a proxy instance and an invocation handler instance;
instruction means for receiving by a particular one of said plurality of translation objects, a particular interface method call that was invoked on said interface, said particular one of said plurality of translation objects for communicating between said interface and a particular one of said version-specific underlying objects, said particular interface method call including a name and formal parameters;
instruction means for translating, by a particular invocation handler instance that is included in said particular one of said plurality of translation objects, said particular interface method call by determining a version-specific method call that corresponds to said particular interface method call using said name and said formal parameters of said particular interface method call;
instruction means for invoking, by said particular invocation handler instance, said version-specific method call;
wherein, said plurality of translation objects are used to translate interface method calls that were invoked on said interface to corresponding version-specific method calls for each version of said underlying object; and
instruction means for generating said plurality of translation objects from a single proxy class and a single invocation handler class, wherein the same proxy class and invocation handler class are used to generate said plurality of translation objects.

18. The product according to claim 17, further comprising:
instruction means for determining a current version of said underlying object;
instruction means for determining whether a translation object exists for said current version;
in response to determining that said translation object does not exist for said current version, instruction means for generating said translation object for said current version utilizing a building object; and
instruction means for including said generated translation object for said current version in said plurality of translation objects.

19. The product according to claim 18, further comprising: instruction means for creating said building object utilizing said proxy class and said invocation handler class.

20. The product according to claim 17, further comprising:
instruction means for generating a building instance of said proxy class and said invocation handler class;
instruction means for utilizing said building instance to generate said proxy instance and said invocation handler instance.

21. The product according to claim 17, further comprising:
instruction means for invoking said particular interface method call by a client object; and
instruction means for returning, by said particular invocation handler instance, said return object to said client object.

22. The product according to claim 21, further comprising:
instruction means for determining whether said return object is a second interface; and
in response to a determination that said return object is said second interface, instruction means for creating a second proxy instance that implements a return type for said second interface.

23. The product according to claim 21, further comprising:
- instruction means for determining whether said return object is a second interface;
- in response to determining that said return object is said second interface, instruction means for determining whether said return type is an array; and
- in response to determining that said return object is an array, instruction means for creating a separate proxy instance that implements a return type for said second interface for each element of said array.

24. The product according to claim 17, further comprising:
- instruction means for determining whether any of said formal parameters are proxy objects; and
- in response to determining that at least one of said formal parameters are proxy objects, instruction means for replacing each said proxy object with an underlying object type for said particular one of said version-specific underlying objects.

* * * * *